United States Patent
Ganis et al.

(10) Patent No.: US 9,915,187 B2
(45) Date of Patent: Mar. 13, 2018

(54) BYPASS APPARATUS FOR REDUCING A RECIRCULATION OF HEATED AIR INTO A COOLING APPARATUS

(71) Applicant: MAN Truck & Bus AG, München (DE)

(72) Inventors: Maximilian L. Ganis, München (DE); Roland Kopp, München (DE)

(73) Assignee: MAN Truck & Bus AG, München (DE)

( * ) Notice: Subject to any disclaimer, the term of this patent is extended or adjusted under 35 U.S.C. 154(b) by 0 days.

(21) Appl. No.: 15/244,876

(22) Filed: Aug. 23, 2016

(65) Prior Publication Data

US 2017/0058757 A1 Mar. 2, 2017

(30) Foreign Application Priority Data

Aug. 26, 2015 (DE) .................. 10 2015 011 192

(51) Int. Cl.
*B60K 11/06* (2006.01)
*F01P 11/10* (2006.01)
*F01P 5/06* (2006.01)

(52) U.S. Cl.
CPC .............. *F01P 11/10* (2013.01); *B60K 11/06* (2013.01); *F01P 5/06* (2013.01)

(58) Field of Classification Search
CPC ............................... B60K 11/04; B60K 11/06
USPC ................................................ 180/68.1, 68.2
See application file for complete search history.

(56) References Cited

U.S. PATENT DOCUMENTS

| 4,934,449 | A | * | 6/1990 | Watt | B60K 11/08 165/109.1 |
|---|---|---|---|---|---|
| 5,427,502 | A | * | 6/1995 | Hudson | F01P 5/06 123/41.49 |
| 5,701,854 | A | * | 12/1997 | Hauser | F04D 29/545 123/41.49 |
| 5,901,786 | A | * | 5/1999 | Patel | B60K 11/04 123/41.04 |
| 6,385,968 | B1 | * | 5/2002 | Gustafsson | B60K 13/04 123/41.09 |
| 7,021,411 | B2 | * | 4/2006 | Maeda | B62D 25/084 180/68.4 |

(Continued)

FOREIGN PATENT DOCUMENTS

DE 102011121624 A1 6/2013
DE 102013000813 A1 7/2014

(Continued)

OTHER PUBLICATIONS

European Search Report issued in corresponding application No. 16001581.4 dated Jan. 30, 2017.

*Primary Examiner* — Jeffrey J Restifo
(74) *Attorney, Agent, or Firm* — Carter, DeLuca, Farrell & Schmidt, LLP

(57) ABSTRACT

A device for cooling a drive apparatus, of a motor vehicle, including a cooling apparatus through which air can flow in a throughflow direction, a redirection apparatus and a ventilator apparatus. The device includes a bypass apparatus located such that air heated by the cooling apparatus or the drive apparatus which is flowing in the direction of the cooling apparatus is at least partially induced into the bypass apparatus and prevented from reaching the cooling apparatus.

16 Claims, 3 Drawing Sheets

(56) References Cited

U.S. PATENT DOCUMENTS

| | | | |
|---|---|---|---|
| 7,998,233 B2 * | 8/2011 | Maeda | F02M 35/04 123/198 E |
| 8,091,516 B2 * | 1/2012 | Preiss | B60K 11/04 123/41.05 |
| 8,256,496 B2 * | 9/2012 | Shuttleworth | F01P 5/06 123/41.31 |
| 8,403,089 B2 * | 3/2013 | Braun | B60K 11/08 180/68.1 |
| 9,222,448 B2 * | 12/2015 | Ghorpade | F02M 35/164 |
| 2008/0017138 A1 * | 1/2008 | Rogg | B60K 11/04 123/41.05 |
| 2008/0257286 A1 * | 10/2008 | Harich | B60K 11/085 123/41.12 |
| 2009/0266312 A1 * | 10/2009 | Preiss | B60K 11/04 123/41.05 |
| 2017/0058757 A1 * | 3/2017 | Ganis | B60K 11/06 |

FOREIGN PATENT DOCUMENTS

| | | |
|---|---|---|
| EP | 0675268 A1 | 10/1995 |
| JP | 2001-090538 A | 4/2001 |
| JP | 2003-306046 A | 10/2003 |
| WO | 2008/111906 A1 | 9/2008 |

\* cited by examiner

BYPASS APPARATUS FOR REDUCING A RECIRCULATION OF HEATED AIR INTO A COOLING APPARATUS

BACKGROUND

The invention relates to a device and indeed in particular for cooling a drive apparatus, in particular of a motor vehicle.

A plurality of devices for cooling motor vehicle internal combustion engines are already known in the prior art. The devices normally comprise a cooling apparatus through which air can flow in a throughflow direction, a redirection apparatus and a ventilator apparatus. It is problematic here that some of the air heated by the cooling apparatus and as a result by the internal combustion engine usually flows back to the cooling apparatus and is sucked in and heated by the cooling apparatus. The flowing back of air heated by the cooling apparatus and the internal combustion engine leads to a significant reduction in the efficiency of the cooling apparatus.

SUMMARY

One object of the invention is to create a possibility by means of which a reduction in efficiency of a cooling apparatus caused by heated air flowing back can be reduced or even avoided.

This object can be achieved with the features of the main claim. Advantageous further developments of the invention can be inferred from the subordinate claims and the following description of preferred embodiments of the invention.

The invention creates a device and indeed in particular for cooling a drive apparatus (e.g. an engine, expediently an internal combustion engine), preferably a motor vehicle. The motor vehicle can be a car or a commercial vehicle, in particular a heavy goods vehicle or a bus.

The drive apparatus can nevertheless also be e.g. a drive apparatus of a construction machine. Cooling of the drive apparatus can expediently be carried out e.g. by means of a cooling air flow out of the ventilator apparatus and/or by means of a cooling medium which can be cooled by the cooling apparatus, such as e.g. cooling water, oil, etc.

The device comprises a cooling apparatus (e.g. a heat exchanger) through which air can flow in a throughflow direction, a ventilator apparatus (e.g. a ventilator) and a redirection apparatus (e.g. a fan cover), which is expediently arranged between the cooling apparatus and the ventilator apparatus. Air can also expediently flow through the redirection apparatus and/or the ventilator apparatus in the throughflow direction.

The device is characterized in particular in that it comprises a bypass apparatus in order to suck air which is flowing back in particular in a flow-back direction and is heated by the cooling apparatus and/or the drive apparatus by vacuum generated by the ventilator apparatus, so that it is at least partially, preferably at least mostly, prevented that heated air is sucked through the cooling apparatus.

As a result, it is enabled that the heat is not heated up further since it is not sucked continuously or several times through the cooling apparatus. Cooler air can also flow through the cooling apparatus where heated air which otherwise flows back flows through. As a result, on average, more fresh and/or cool air can flow through the cooling apparatus. The higher temperature difference leads to an improved performance of the cooling apparatus.

The bypass apparatus serves to reduce and/or prevent recirculation or flowing back of air heated by in particular the cooling apparatus and expediently the drive apparatus into the cooling apparatus. As a result of the bypass apparatus, it is in particular enabled that air heated by the cooling apparatus and the drive apparatus is not again sucked through the cooling apparatus and heated further as a result. For example, the engine compartment temperature can thus be reduced and the cooling performance of the cooling apparatus improved.

It is possible that the bypass apparatus is formed in order to guide air which is flowing back and is heated by the cooling apparatus and/or the drive apparatus indirectly or directly to the ventilator apparatus.

The bypass apparatus can lead e.g. internally through the redirection apparatus and/or be formed by the redirection apparatus.

The bypass apparatus can furthermore be guided e.g. externally along the redirection apparatus and comprise e.g. at least one tube, pipe or another channel-generating part.

The bypass apparatus expediently has an inlet opening for air which is flowing back and is heated by the cooling apparatus and/or the drive apparatus.

It is possible that the redirection apparatus projects radially beyond the outer circumference of the cooling apparatus, e.g. radially, in order to form the inlet opening.

The inlet opening can extend e.g. above, below and/or laterally of the cooling apparatus and/or the redirection apparatus.

The inlet opening can e.g. lead into the redirection apparatus and/or be formed by the rear side of the redirection apparatus so that e.g. air which is flowing back and is heated by the cooling apparatus and/or the drive apparatus can flow along the other circumference of the redirection apparatus in order to arrive at the bypass apparatus by means of a change in direction, e.g. by more than 90°, more than 120°, more than 160° or by substantially 180°. Alternatively or additionally, the inlet opening can be formed upstream of the ventilator apparatus relative to the throughflow direction.

It is possible that the inlet opening extends over the substantially entire width and/or height of the cooling apparatus and/or the redirection apparatus.

The inlet opening can be oriented in an opposite direction to the throughflow direction so that it can point in particular towards the air inlet side of the cooling apparatus.

It is possible that the inlet opening is formed to guide air which is flowing back and is heated by the cooling apparatus and/or the drive device into the redirection apparatus so that it meets air from the cooling apparatus in the redirection apparatus, in particular is brought into connection therewith and/or at least partially mixed therewith.

The bypass apparatus can run e.g. obliquely and/or from the outside to the inside relative to the throughflow direction (e.g. from top to bottom, from bottom to top, from laterally outside to laterally inside, etc.) in order to guide air which is flowing back and is heated by the cooling apparatus and/or the drive apparatus indirectly or directly to the ventilator apparatus.

It is possible that the redirection apparatus is embodied as a fan cover and/or tapers by means of a tapering region towards the ventilator apparatus, wherein the tapering region can preferably expediently form at least a part of the bypass apparatus.

The vacuum in the redirection apparatus can preferably be generated by rotation by means of ventilator blades of the ventilator apparatus.

It should be mentioned that the ventilator apparatus is expediently formed to suck air through the cooling apparatus.

It should also be mentioned that the redirection line can expediently be embodied as a redirection housing, in particular fan cover.

It should furthermore be mentioned that the heated air which is flowing back can originate e.g. from an engine compartment of the drive apparatus.

It should furthermore be mentioned that the inlet opening of the bypass apparatus can be arranged e.g. upstream, downstream, above, below and/or laterally of the cooling apparatus relative to the throughflow direction.

It should furthermore be mentioned that the cooling apparatus is embodied in particular as a heat exchanger which cools internal combustion engine cooling medium (e.g. cooling water, oil, etc.) which is flowing through with the air which is flowing through. The temperature potential is transmitted as a result of the temperature difference of the medium to the air so that the medium cools and the air heats up. The air is thus usually already blown at a very high temperature to the drive apparatus, in particular into the engine compartment. Moreover, the heated air still also acts e.g. as cooling of components in the engine compartment, such as e.g. exhaust gas pot and engine. However, the heating of the air by these components is usually only small since the air experiences the majority of the heating within the cooling apparatus. The cooling of the internal combustion engine is carried out expediently internally via the medium.

The invention furthermore comprises a motor vehicle, e.g. a car or a commercial vehicle, in particular a bus or a heavy goods vehicle, with a device as disclosed herein.

The preferred features and embodiments of the invention described above can be combined with one another. Other advantageous further developments of the invention are disclosed in the subordinate claims or will become apparent from the following description of preferred exemplary embodiments in combination with the enclosed figures.

DETAILED DESCRIPTION

The embodiments shown in the figures partially correspond so that the same reference signs are used for identical or similar parts and for an explanation of which reference is also made to the description of the other embodiments in order to avoid repetition.

Figure 1:
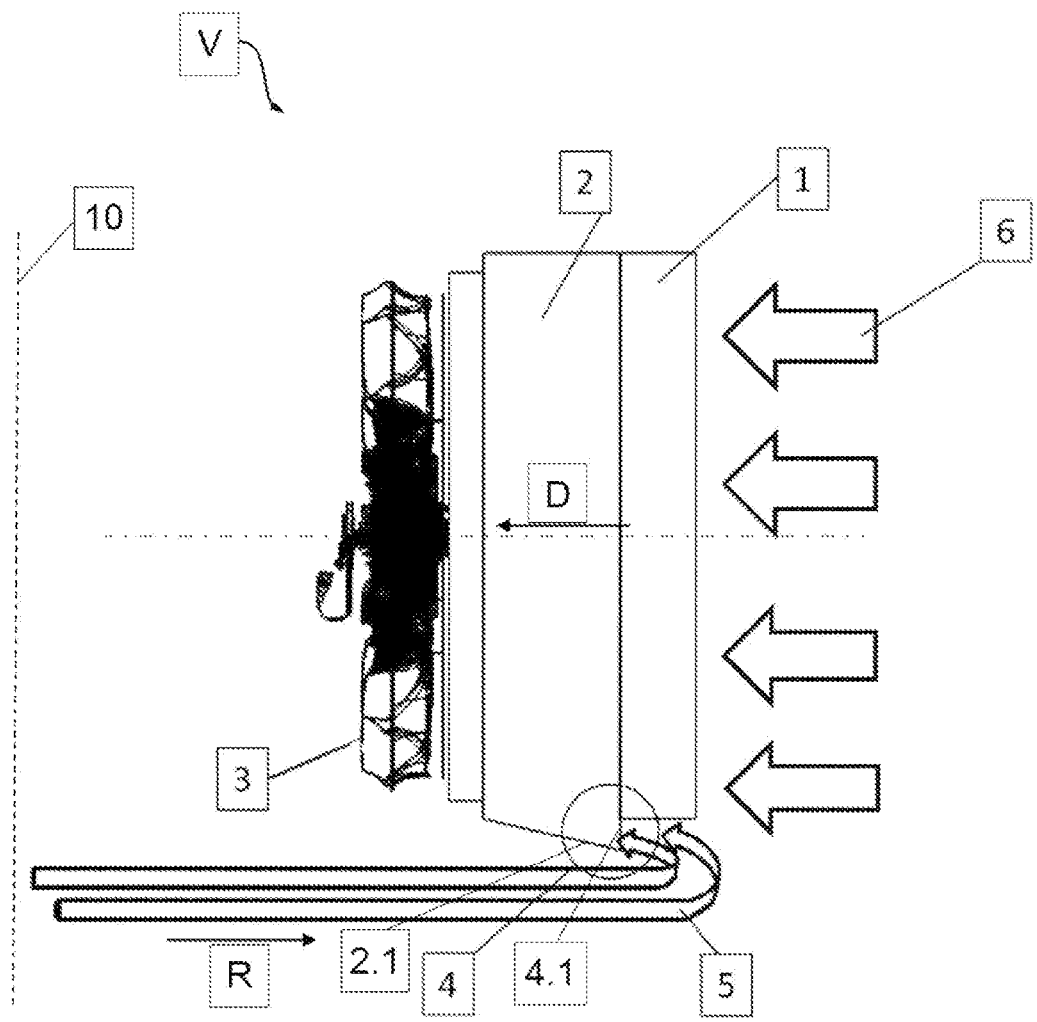
FIG. 1 shows a view of a device according to one embodiment of the invention.
Figure 2:
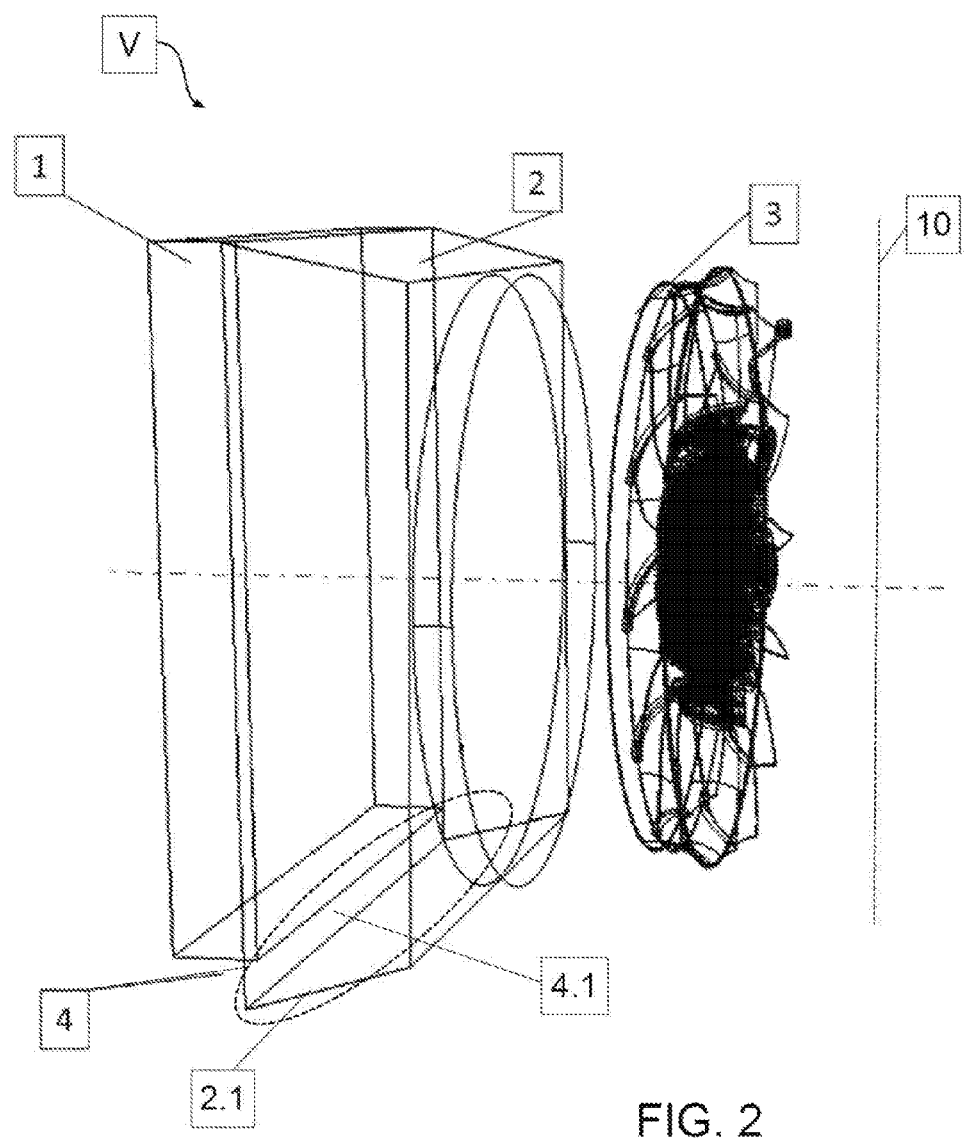
FIG. 2 shows a perspective view of the device of FIG. 1.

FIG. 1 shows a view of a device V according to one embodiment of the invention, while FIG. 2 shows an associated perspective view. Device V is described below with joint reference to FIGS. 1 and 2.

Device V serves for positioning upstream of a drive apparatus 10 only represented schematically, e.g. an internal combustion engine, for a motor vehicle.

Device V comprises a cooling apparatus 1 (e.g. a heat exchanger), a redirection apparatus (e.g. a fan cover) 2 and a ventilator apparatus (e.g. a ventilator apparatus) 3. Air can expediently flow through cooling apparatus 1, redirection apparatus 2 and ventilator apparatus 3 in a throughflow direction D. Reference number 6 characterizes cool, fresh external air which is sucked by means of ventilator apparatus 3 into cooling apparatus 1 in order to cool cooling medium for drive apparatus 10 there.

Cooling apparatus 1 expediently serves to cool cooling medium flowing through cooling apparatus 1 (e.g. cooling water, oil, etc.) with air 6 which is flowing through. As a result of the temperature difference of the medium to the air, the temperature potential is transmitted so that the medium cools and the air heats up. The air is thus usually already blown at a very high temperature to drive apparatus 10, in particular into the engine compartment. Moreover, the heated air still also acts e.g. as cooling of components in the engine compartment, such as e.g. exhaust gas pot and engine. However, the heating of the air by these components is usually only small since the air experiences the majority of the heating within cooling apparatus 1. The cooling of drive apparatus 10 is carried out expediently internally via the cooling medium.

Device V has a bypass apparatus 4 in order to suck air 5 which is flowing back in a flowback direction R and is heated by cooling apparatus 1 and at least slightly drive apparatus 10 by vacuum generated by ventilator apparatus 3 into redirection apparatus 2 and thus it is at least partially, preferably substantially entirely prevented that heated air 5 which is flowing back is sucked through cooling apparatus 1. Bypass apparatus 4 consequently reduces and/or prevents recirculation, i.e. the flowing back of air 5 heated by cooling apparatus 1 and drive apparatus 10 into cooling apparatus 1.

By means of bypass apparatus 4, heated air 5 is consequently not once again sucked through cooling apparatus 1 and heated on a quasi ongoing basis. The temperature in particular in the engine compartment can thus be reduced and the cooling performance of cooling apparatus 1 can be improved.

Bypass apparatus 4 is formed to guide heated air 5 to ventilator apparatus 3.

Bypass apparatus 4 runs internally through redirection apparatus 2 and is formed by redirection apparatus 2 itself. Alternatively or additionally, it is nevertheless possible that bypass apparatus 4 is guided e.g. externally along redirection apparatus 2, e.g. by means of one or more tubes, pipes or another channel-generating parts. It is possible to guide the air externally, but the air must be introduced upstream of ventilator apparatus 3 such that the air can be sucked in by ventilator apparatus 3.

Bypass apparatus 4 comprises an inlet opening 4.1 via which heated air 5 which is flowing back can be guided into redirection apparatus 2. Inlet opening 4.1 is preferably arranged below cooling apparatus 1, but can also be arranged laterally of or above cooling apparatus 4.1.

Inlet opening 4.1 can in particular be formed in that redirection line 2 projects beyond the outer circumference of cooling apparatus 1. Inlet opening 4.1 can expediently be formed by the rear side of redirection apparatus 2 and can expediently lead into redirection apparatus 2. Inlet opening 4.1 is preferably oriented in the opposite direction to throughflow direction D, therefore points to the right in FIG. 1. Inlet opening 4.1 is formed to guide heated air 5 which is flowing back into redirection apparatus 2 so that heated air 5 which is flowing back meets air from cooling apparatus 1 in redirection apparatus 2, in particular at least partially mixes therewith. The mixing does not, however, have to take place in redirection apparatus 2. The air can also be sucked away separately from redirection apparatus 2, e.g. via a separate ventilator.

As a result of bypass apparatus 4, heated air is once again sucked through cooling apparatus 1 and heated further. The engine compartment temperature can thus be reduced and the cooling performance improved. The air is not further heated up because it is not sucked several times, in particular not continuously, through cooling apparatus 1. Moreover, cooler air flows through cooling apparatus 1, where otherwise heated air which is flowing back flows through. As a result, on average, more cool air can flow into cooling apparatus 1. This higher temperature difference leads to an improvement in performance of cooling apparatus 1.

Bypass apparatus 4 can run obliquely, in particular from the outside to the inside relative to throughflow direction D in order to guide air from radially outside of ventilator apparatus 3 towards ventilator apparatus 3. For this purpose, redirection apparatus 2 can taper by means of a tapering region 2.1 towards ventilator apparatus 3, wherein tapering region 2.1 forms at least a part of bypass apparatus 4. Tapering region 2.1 is, however, not absolutely essential. Bypass apparatus 4 also does not necessarily have to be integrated into redirection apparatus 2.

It can be inferred in particular from FIG. 2 that inlet opening 4.1 can extend over the substantially entire width of cooling apparatus 1 and/or redirection apparatus 2. Alternatively or additionally, embodiments are possible in which inlet opening 4.1 can extend over the substantially entire height of cooling apparatus 1 and/or redirection apparatus 2.

Figure 3:
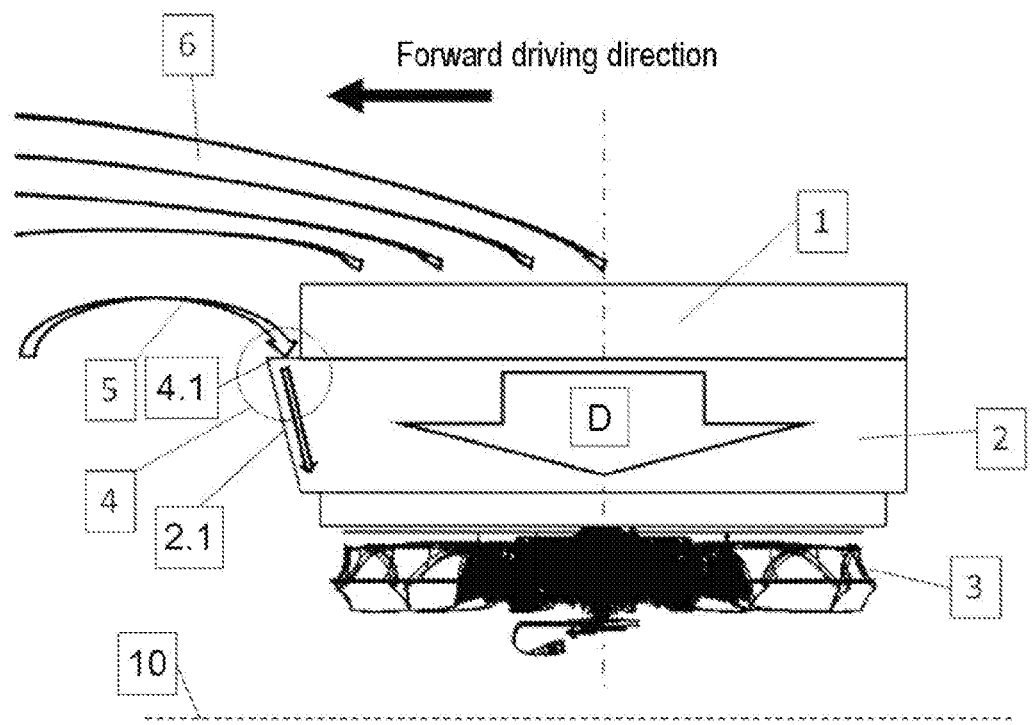
FIG. 3 shows a view of a device according to a different embodiment of the invention.

FIG. 3 shows a view of a device V according to a different embodiment of the invention.

One particular feature of the embodiment shown in FIG. 3 is that inlet opening 4.1 of bypass apparatus 4 is located upstream of cooling apparatus 1 as seen in the forward driving direction of the motor vehicle, is formed in particular laterally on cooling apparatus 1 and/or redirection apparatus 2.

The invention is not restricted to the preferred exemplary embodiments described above. On the contrary, a plurality of variants and modifications are possible which also make use of the concept of the invention and thus fall into the scope of protection. Moreover, the invention also claims protection for the subject matter and the features of the subordinate claims independently of the claims referred to.

The invention claimed is:

1. A device for cooling a drive apparatus of a motor vehicle, comprising:
    a cooling apparatus through which air can flow in a throughflow direction;
    a redirection apparatus operatively associated with the cooling apparatus;
    a ventilator apparatus generating a vacuum and inducing air flow through the cooling apparatus and the redirection apparatus in the throughflow direction, and
    a bypass apparatus, in fluid communication with the ventilator apparatus and located such that air heated by the cooling apparatus or the drive apparatus which is flowing in the direction of the cooling apparatus is at least partially induced into the bypass apparatus and prevented from reaching the cooling apparatus;
    wherein the bypass apparatus includes an inlet opening for receiving air heated by the cooling apparatus or the drive apparatus;
    wherein the redirection apparatus projects beyond the outer circumference of the cooling apparatus in order to form the inlet opening; and
    wherein the inlet opening extends over substantially the entire width or height of the cooling apparatus.

2. The device according to claim 1, wherein the bypass apparatus is formed to guide the air heated by the cooling apparatus or the drive apparatus to the ventilator apparatus.

3. The device according to claim 1, wherein the bypass apparatus is in fluid communication with the redirection apparatus.

4. The device according to claim 1, wherein the bypass apparatus is formed by the redirection apparatus.

5. The device according to claim 1 wherein the bypass apparatus is formed externally along at least a portion of the redirection apparatus.

6. The device according to claim 1, wherein the inlet opening is formed on a side of the redirection apparatus, proximate the cooling apparatus.

7. The device according to claim 1, wherein the inlet opening is formed upstream of the ventilator apparatus relative to the throughflow direction.

8. The device according to claim 1, wherein the inlet opening extents over substantially the entire width or height of the redirection apparatus.

9. The device according to claim 1, wherein the inlet opening is oriented opposite to the throughflow direction.

10. The device according to claim 1, wherein the inlet opening is formed to guide air heated by the cooling apparatus or the drive apparatus into the redirection apparatus so that it meets air from the cooling apparatus in the redirection apparatus.

11. The device according to claim 1, wherein the inlet opening extends above, below or laterally of the cooling apparatus or the redirection apparatus.

12. The device according to claim 1 wherein the bypass apparatus runs obliquely relative to the throughflow direction in order to guide heated air to the ventilator apparatus.

13. The device according to claim 1 wherein the bypass apparatus runs from the outside to the inside relative to the throughflow direction in order to guide heated air to the ventilator apparatus.

14. The device according to claim 1, wherein the redirection apparatus is a fan cover and tapers by means of a tapering region towards the ventilator apparatus, and the tapering region forms at least a part of the bypass apparatus.

15. The device according to claim 1 wherein the ventilator apparatus includes blades and the vacuum in the redirection apparatus can be generated by rotation of the blades.

16. A motor vehicle comprising:
    a cooling apparatus through which air can flow in a throughflow direction;
    a redirection apparatus operatively associated with the cooling apparatus;
    a ventilator apparatus generating a vacuum and inducing air flow through the cooling apparatus and the redirection apparatus in the throughflow direction, and
    a bypass apparatus, in fluid communication with the ventilator apparatus and located such that air heated by the cooling apparatus or the drive apparatus which is flowing in the direction of the cooling apparatus is at least partially induced into the bypass apparatus and prevented from reaching the cooling apparatus;
    wherein the bypass apparatus includes an inlet opening for receiving air heated by the cooling apparatus or the drive apparatus;
    wherein the redirection apparatus projects beyond the outer circumference of the cooling apparatus in order to form the inlet opening; and wherein the inlet opening extends over substantially the entire width or height of the cooling apparatus.

* * * * *